United States Patent [19]

Cuda

[11] Patent Number: 4,763,437
[45] Date of Patent: Aug. 16, 1988

[54] FISHING APPARATUS

[76] Inventor: Ross F. Cuda, P.O. Box 5693, Missoula, Mont. 59803

[21] Appl. No.: 104,660

[22] Filed: Oct. 5, 1987

[51] Int. Cl.$^4$ ...................... A01K 91/00; A01K 97/12
[52] U.S. Cl. ........................................ 43/43.13; 43/17
[58] Field of Search ............... 43/43.13, 17, 26.1, 43/42.22

[56] References Cited

U.S. PATENT DOCUMENTS

| | | | |
|---|---|---|---|
| 809,965 | 1/1906 | Lystne | 43/43.13 |
| 1,304,983 | 5/1919 | Howerton | 43/43.13 |
| 1,307,623 | 6/1919 | Edmondson | 43/43.13 |
| 1,642,582 | 9/1927 | Hanson | 43/43.13 |
| 1,723,236 | 8/1929 | Hanson | 43/43.13 |
| 2,608,790 | 9/1952 | McFarland | 43/42.22 |
| 2,862,326 | 12/1958 | Minera | 43/43.13 |
| 3,044,208 | 7/1962 | Minera | 43/43.13 |
| 3,142,929 | 8/1964 | Killilea | 43/43.13 |
| 3,216,147 | 11/1965 | Minera | 43/43.13 |
| 3,318,038 | 5/1967 | Delsol | 43/43.13 |
| 3,464,142 | 9/1969 | Hubbart | 43/43.13 |
| 3,760,762 | 9/1973 | Spongberg | 43/43.13 |
| 3,973,347 | 8/1976 | Kearney | 43/43.13 |
| 4,021,958 | 5/1977 | Snodie | 43/17 |
| 4,461,115 | 7/1984 | Carrillo | 43/43.13 |
| 4,464,858 | 8/1984 | Wright | 43/43.13 |
| 4,703,580 | 11/1987 | Kammeraad | 43/43.13 |

*Primary Examiner*—Gene P. Crosby
*Attorney, Agent, or Firm*—William D. West

[57] ABSTRACT

A fishing apparatus for assisting an angler in the placement of a lure or bait in a lake or stream is disclosed. The apparatus provides parallel buoyant hulls having vertical planes depending downward therefrom with adjustable hydrofoils attached to the planes. The device further provides a release mechanism and spring-biased visible trip flag. Methods of use of the device are also disclosed.

13 Claims, 3 Drawing Sheets

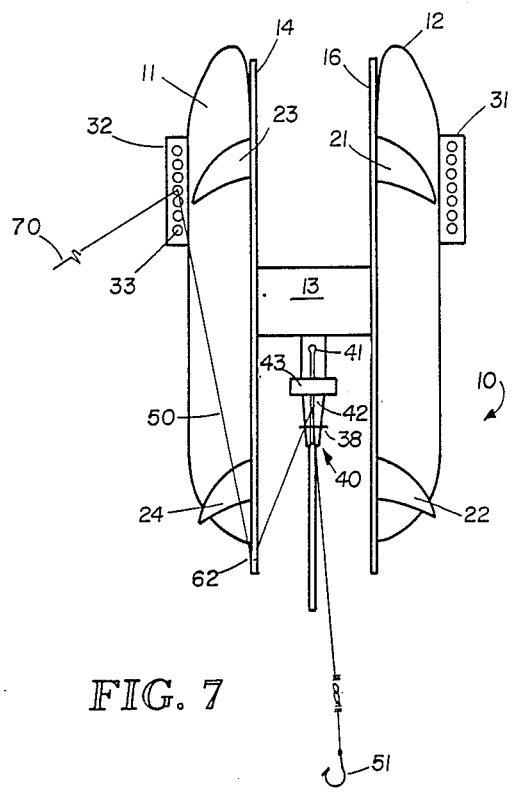
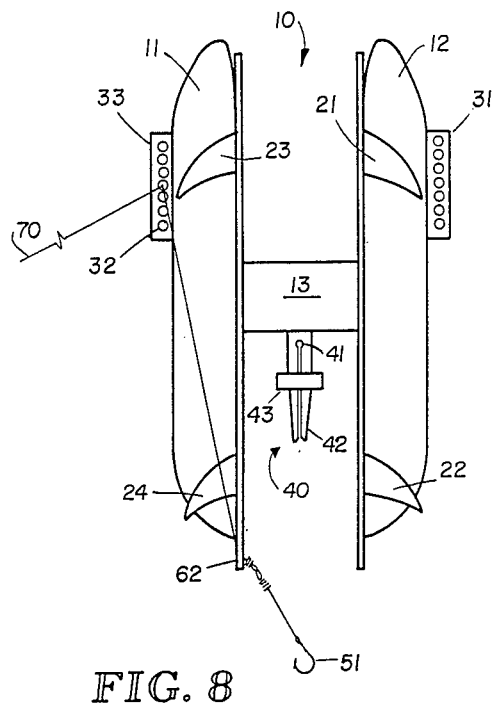
FIG. 7  FIG. 8
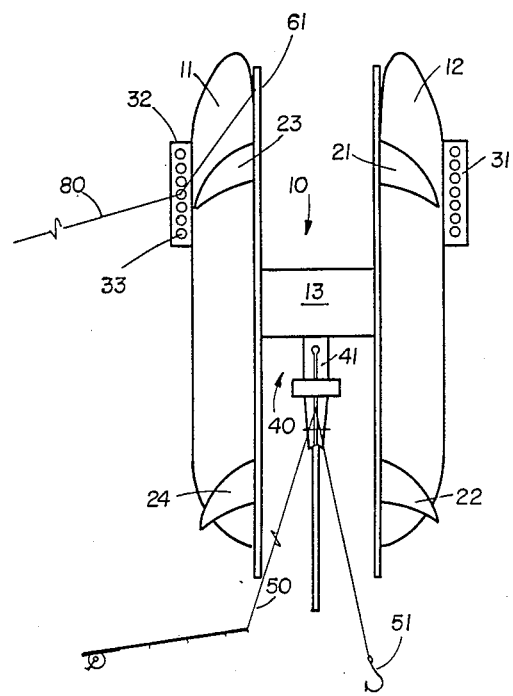
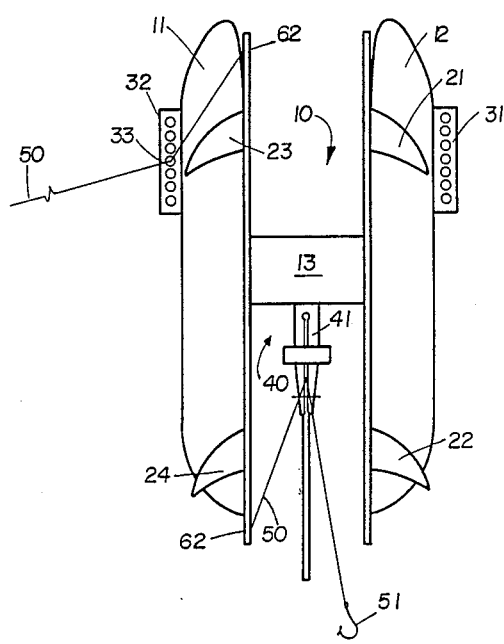
FIG. 9  FIG. 10

FISHING APPARATUS

BACKGROUND OF THE INVENTION

1. Field of the invention.

The invention relates to a fishing apparatus and in particular to a side-planing river trolling device.

2. Discussion of the Technical Problems.

Sport angling is a popular pastime. Increasingly greater number of people are now enjoying the sport of fishing. Many people use small boats and others fish from the sides of streams or lakes.

A problem plaguing many fishermen is the problem of casting a lure or bait sufficiently far from shore so that it is placed in the vicinity of the fish. Additionally, undesirable conditions may exist in stream or river fishing when the lure is cast by an angler situated on the bank of the stream. The lure tends to drive downstream until the line is substantially aligned with the direction of the water movement and the lure thus is ultimately placed too close to the bank to be most effective.

In situations where a number of people are trolling from a small boat, it is easy for the lines of the trollers to become entangled. Thus it is also desirable to have a means by which the bait or lures could be placed at a distance from the boat without facing the inherent tangling problem.

A number of devices have been devised to assist anglers in casting including various floats and the like. Some devices employ the motive power of moving water passing by the fisherman, whether in a boat or alongside a stream. These devices primarily are used to float the bait or lure out into a particular position in the water whereby the fisherman can increase the distance of his cast by the use of such devices. Unfortunately, the prior art floats suffer from a number of definite drawbacks.

Prior art fishing floats, current corks, and what have been called fishing kites generally do not allow the angler to have a fine-tuned control of the device so that the lure or bait can be placed where desired. They generally do not either provide sufficient buoyancy, fail to have trip flags or other visual indicators that a fish has taken the bait or lure, fail to have sufficient line tension adjustment, and fail to provide positive means of releasing the line when the fish strikes.

Examples of fishing floats, kites, trolling devices, and the like can be found in U.S. Pat. Nos. 4,461,115 issued July 24, 1984 to Carrillo, 4,464,858 issued Aug. 14, 1984 to Wright, 3,464,142 issued Sept. 2, 1969 to Hubbart, 2,862,326 issued Dec. 2, 1958 to Minera, 3,760,762 issued Sept. 22, 1973 to Spongberg, 3,318,038 issued May 9, 1967 to Delsol, 809,965 issued Jan. 16, 1906 to Lystne, 3,044,208 issued July 17, 1962 to Minera, and 3,216,147 issued Nov. 9, 1965 to Minera.

Very few devices in the known art relate to a fishing apparatus having two hulls and none known are directed to providing fishing devices having two air-filled hulls and providing a trip flag along with a fine adjustment line tension and positive control whereby the angler can control the placement of the device and the lure or bait with precision.

Accordingly, a need exists for an angling device that would provide a convenient method for precise placement of fishing lures and baits whether angling from a boat or on shore in rivers, streams, or lakes. Such a device would provide a simple, inexpensive apparatus that could enhance the fishing capability of the user by allowing the user to place the fishing lure in a natural setting even at some distance from the angler. Such a device should be easily controlled, have a fine-tune adjustment of the line tension, provide a visual indicator that a fish has taken the lure, and provide for a positive, easily used and adjusted line release. The instant invention is directed to all of these needs as well as to others as explained in the following summary.

SUMMARY OF THE INVENTION

It is a feature of the instant invention to provide a fishing device which allows a fisherman to utilize the flow of water past the fisherman to carry bait or lures at a greater distance than the angler would otherwise be able to. The device can be utilized with one or two lines and can be connected directly to the lure or so that it merely serves as a platform to support the lure in the proper position over the body of water.

These and other features and objects are attained according to the instant invention by providing a fishing device having two air-filled buoyant hulls which are rigidly attached, one to another. The hulls provide buoyancy to support the lure and also allow for greater visibility of the device. Furthermore, the device is provided with two planing surfaces, each in turn being attached to one of the buoyant hulls so that the force of the current will allow the device to move at an angle to the fisherman, thus moving the attached lure into the proper position according to the fisherman's desire. Adjustable foils attached to the submerged planes allow the fisherman to adjust the device for depth control and stability. The foils are rotatably adjusted to allow either the front end or the back end to be adjusted up or down, depending upon the current in which the device is utilized.

The rigid section connecting the two hulls is provided in an air foil or water foil shape at an angle so that the device is self-surfacing. A trip flag is provided to visually indicate to the angler that a fish has been hooked. The trip flag is attached to a release mechanism on the bridge portion between the two hulls. The line release provides for a fine adjustment of the line tension. Attachment holes are provided so that the device can be utilized either with a single line which includes the device with the lure or with two lines in which the line containing the lure is only attached to the device at the line release and a separate line controls the placement of the angling device.

BRIEF DESCRIPTION OF THE DRAWINGS

The advantage of this invention will become apparent upon consideration of the following detailed disclosure of the invention, especially when taken in conjunction with the accompanying drawings herein.

FIG. 7 is a bottom plan view of the device in which a single line is used and the release has not been tripped.

FIG. 8 is a bottom plan view of the device in which a single line is used and the release has been tripped.

FIG. 9 is a bottom plan elevational view of the device utilizing two lines in which the release has not been tripped.

FIG. 10 is a further method of attaching a line so that when tripped, the device would return to the angler's position, all in accordance with the present invention.

DESCRIPTION OF THE PREFERRED EMBODIMENT

Figure 1:
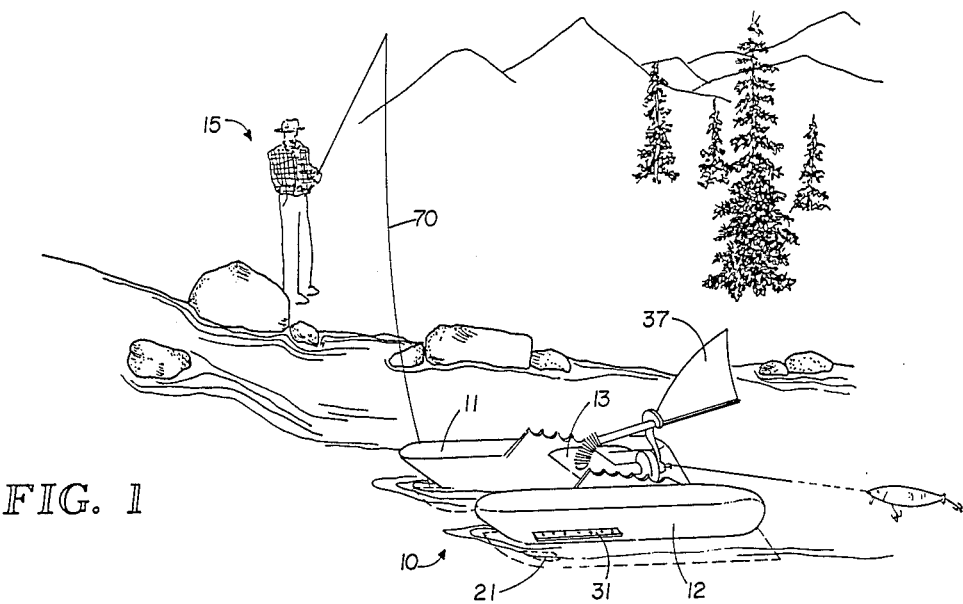
FIG. 1 is a perspective view of the angling device in place in a stream in which the device and a lure are connected and controlled by a single line in accordance with the present invention.
Figure 2:
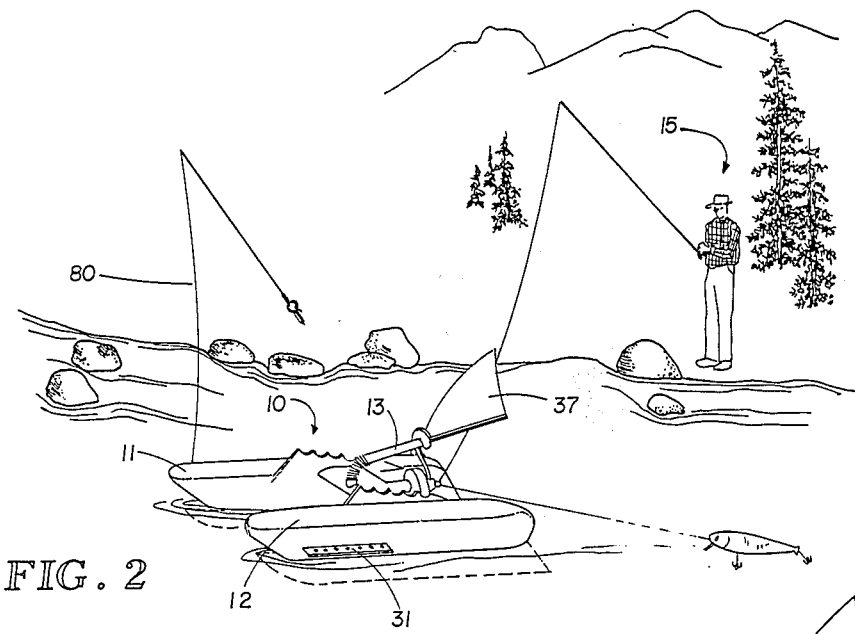
FIG. 2 is a perspective view of the angling device in place in a stream in which the device and a lure are connected and controlled by two lines in accordance with the present invention.
Figure 3:
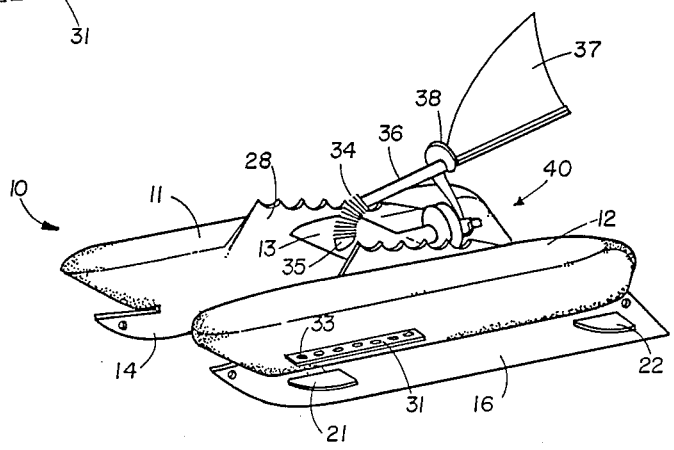
FIG. 3 is a overall perspective view of the angling device as shown out of the water.

The angling device of the instant invention is depicted generally in FIGS. 1, 2, and 3 at numeral 10.

As can be seen by reference to FIG. 1, the device 10 provides a pair of buoyant hulls 11 and 12 which are hollow, air-filled buoyant hulls. In turn, hulls 11 and 12 are rigidly connected to each other by bridge 13.

Figure 4:
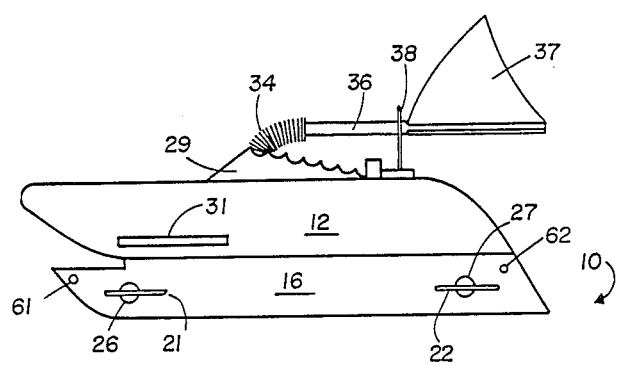
FIG. 4 is a left side elevational view of the device showing the trip flag in the cocked, unreleased position.

With reference to FIG. 3 where the device 10 is depicted outside of the water, it can be seen that hulls 11 and 12 are further connected to vertical planes 14 and 16 which extend beneath buoyant hulls 11 and 12 and depend into the water as shown in FIGS. 1 and 2 to provide a plane against which the angler 15 can pull device 10. With further reference to FIG. 3, it can be seen that vertically depending planes 14 and 16 are further provided with adjustable foils or fins 21, 22, 23, and 24. These adjustable foils can be rotated up and down along swivel disks 26 and 27 as depicted in FIG. 4 so that the angle of the foil 21 and 22 can be adjusted in accordance with the fisherman's desire as to the planing action of the device 10. Further attached to buoyant hulls 11 and 12 are decorative vertical fins 28 and 29 which provide a decorative effect, making the device 10 appear to be fish-like. Vertical fins 28 and 29 also provide structural integrity for the attachment of bridge 13 as can best be shown in FIG. 6. Further attached to buoyant hulls 11 and 12 are horizontal attachment strips 31 and 32 which are provided with holes 33 to allow the fisherman 15 to attach the line for controlling the device 10. As can be seen with reference to FIGS. 6, 7, 8, 9, and 10, the horizontal attachment strips 31 and 32 are provided on both sides of the device 10 so that it can be used from either a right-side or a left-side position.

Figure 5:
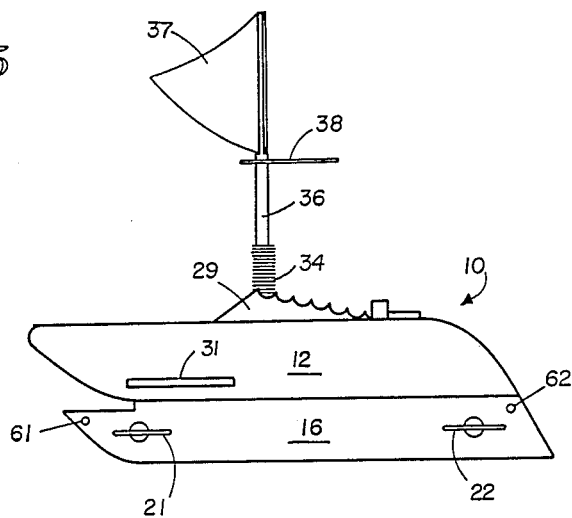
FIG. 5 is a left side elevational view of the device showing the trip flag in the upright, released position indicating a fish strike.
Figure 6:
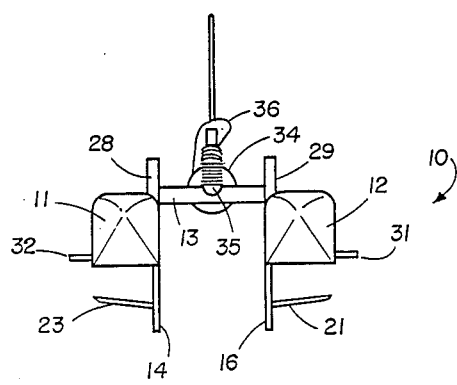
FIG. 6 is a front elevational view of the device.

With reference to FIGS. 3 and 6, it can be seen that bridge 13 is provided with upright post 35 to which spring 34 is attached. Trip flag post 36 is attached to the upper portion of spring 34 by inserting post 36 within spring 34 in a manner well known in the art. Trip flag 37 is attached to pole 36. As can be seen with reference to FIGS. 3, 4, and 5, trip flat 37 can either be in the horizontal position as shown in FIG. 4 or in the upright position as shown in FIG. 5, depending on whether or not it is held down by release hook 38 which is attached to pole 36 and which can be slidably released.

It can be seen by reference to FIG. 3 that release mechanism 40 provides a mechanism by which the strike of a fish is indicated by the upright movement of trip flag 37 and the release of the line having the lure or bait is made so that the fish can be retrieved by the angler 15. The operation of release 40 is depicted in FIGS. 7, 8, 9, and 10. Release 40 is in essence a cylindrical rod 41 extending rearwardly from bridge 13. Rod 41 is provided with a slit 42 separating rod 41 into two halves. Rod 41 is further tapered or threaded to allow keeper 43, which is an annular ring, to be slid or threaded along rod 41 to compress slit 42 together. When line 50 is placed within slit 42 as depicted in FIG. 7, keeper 43 is urged toward bridge 13 along rod 41. The tension on the line release 40 is increased. If a pull or sufficient force is felt at hook 51, line 50 is removed from the slit 42 in release 40 and line 51 is allowed to be free of release 40. The force along line 51 further pushes hook 38 off of tapered end 41 so that trip flag 37 is released to stand in an upright position as depicted in FIG. 5.

It is noted that other attachment holes such as holes 61 and 62 on FIGS. 4 and 5 are provided on both vertical planes 14 and 16 so that additional methods can be employed to attach line 50 to the device 10.

The operation of the device will now be described. There are basically two ways to utilize the device. The first method is to employ a single line as depicted in FIG. 1. The single line allows an angler to attach line 70 through horizontal attachment point 32 through one of the holes 33 in horizontal attachment point 32 whereby the line is then run back through hole 62 and thereupon up through slit 42 in releasse 40 as all depicted in FIG. 7. By utilizing the single-line method, if a fish should strike or hook himself on hook 51 as depicted in FIG. 7, the pull on line 50 would release the trip flag 37 and line 70 would pull through hole 33 in horizontal attachment 32. At that time, line 50, which is a continuation of line 70, after releasing from release mechanism 40, would allow the line to move so that hook 51 moves up to hole 62 in vertical plane 16. When that occurs, device 10 is positioned near the hooked fish (not shown) which is hooked onto hook 51, and both fish and device 10 are reeled in toward fisherman 15 in a normal manner.

By use of the single-line method as shown in FIGS. 1, 7, and 8, an angler need not use an additional rod and reel to position device 10. If one wished to use a two-line method, it is possible for angler 15 to attach a separate line 80 onto the device 10 by means of placing it in one of the holes 33 in horizontal attachment point 32 and thereupon up to hole 61 for a rigid attachment. By placing line 80 in a different hole 33 in horizontal attachment 32, the angle of device 10 with respect to the fisherman can be varied so that the device will move farther upstream or farther downstream as desired. The attachment hole utilized varies with the conditions; however, it gives the fisherman great flexibility in determining the placement of the device 10. Similarly, when using a single-line method, it is possible to route the single line through a different hole 33 in horizontal attachment 32 to achieve the same angled relationship, thus placing device 10 where desired.

Still in reference to FIG. 9 where it can be seen that a separate line 50 having hook 51 is routed into the line release 40 as previously described with reference to line release 40 so that when a fish attaches itself to hook 51, the resulting pull releases trip flag 37 and line 51. When that takes place, the fisherman can see that the line has been released. Device 10 would remain in essentially the same position; however, the fish is only attached to line 50 and is free from device 10. The fisherman thus lands the fish in a normal manner.

A further method of attaching the device is depicted in FIG. 10 in which a single line 50 is routed up through hole 33 in horizontal attachment 32, then up through hole 61, back to hole 62, and then up through line release 40 in the same manner as previously described. If a fish should impale itself upon hook 51, the resulting pull would release trip flag 37 as well as line 50. However, the device would remain attached to line 50 and since it is routed up further to the nose by way of hole 62 of the device, the device would then plane toward the fisherman, thus helping to retrieve the fish.

It should be noted that additional decorative embellishments such as teeth as depicted in FIGS. 1 and 2 could be utilized with the device in order to further enhance its attractiveness.

The use of foils 21, 22, 23, and 24 as previously described to set the plane of the device in an adjustable fashion allow greater control by the fisherman at which depth the device 10 will ride in the water. In strong current, foils 21, 22, 23, and 24 reduce the drag of the device 10 as the device 10 is raised slightly out of the water so that hulls 11 and 12 are not as deep as they previously were and the resultant pull on the device is reduced even as to the flow of the water is increased, thus making it much more convenient for the fisherman to employ the device without excessive drag.

It is to be understood in the preferred embodiment that the device is composed of a polycarbonate or polystyrene plastic; however, any suitable material which is water-resistant could be employed with varying degrees of quality. It is contemplated that the device could be manufactured in a number of bright colors which would allow the device 10 to be easily seen even in twilight hours when many fishermen would be utilizing it.

Although specific applications, materials, components, connections, sequences of events and methods have been stated in the above description of the preferred embodiment of the invention, other suitable materials, other applications, components, and process steps as listed herein may be used with satisfactory results and varying degrees of quality. In addition, it will be understood that various other changes in details, materials, steps, arrangements, parts, and uses which have been herein described and illustrated in order to explain the nature of the invention will occur to and may be made by those skilled in the art, upon a careful reading of this disclosure, and such changes are intended to be included within the principles and scope of this invention as hereinafter claimed.

I claim:

1. A fishing apparatus comprising a first buoyant hull having a downwardly depending side plane attached thereto; a second buoyant hull having a downwardly depending side plane attached thereto; a rigid bridge means attached between said first hull and said second hull; and a fishing line release means attached to said bridge.

2. The fishing apparatus as described in claim 1 wherein said first and said second hulls are each comprised of elongate buoyant closed tubes aligned substantially parallel to one another.

3. The fishing apparatus as described in claim 2 wherein said bridge is comprised of an angled foil means.

4. The fishing apparatus as described in claim 1 further comprising side horizontal attachment means.

5. The fishing apparatus as described in claim 4 further comprising holes within said side horizontal attachment means.

6. The fishing apparatus as described in claim 5 further comprising fishing line attachment means attached to said side planes.

7. The fishing apparatus as described in claim 1 further comprising trip flag means.

8. The fishing apparatus as described in claim 7 wherein said trip flag means comprises a substantially vertical post attached to said bridge; a trip flag post; a coil spring attached between said bridge vertical post and said trip flag post; and a flag member attached to said trip flag post.

9. The fishing apparatus as described in claim 1 wherein said line release means comprises a substantially horizontal rod depending rearwardly from said bridge wherein said rod is provided with a slit therewithin and wherein said rod is tapered and wherein said rod is further provided with a sliding ring.

10. The fishing apparatus as described in claim 9 wherein said horizontal rod is threaded and a threaded nut co-acting upon said threaded rod to squeeze said slit.

11. The fishing apparatus as described in claim 1 further comprising decorative fin means attached to said first and said second hull.

12. The fishing apparatus as described in claim 11 further comprising substantially horizontal foils attached to said side planes.

13. The fishing apparatus as described in claim 12 wherein said horizontal foils are selectively rotatable in pitch angle.

* * * * *